United States Patent [19]
Varley

[11] Patent Number: 5,331,802
[45] Date of Patent: Jul. 26, 1994

[54] SECURITY CHAIN MADE FROM A SERIES OF LINKS

[76] Inventor: Simon Varley, Camelot, Chillies Lane, Crowborough, E. Sussex, England

[21] Appl. No.: 910,265
[22] PCT Filed: Jan. 18, 1991
[86] PCT No.: PCT/GB91/00075
  § 371 Date: Jul. 16, 1992
  § 102(e) Date: Jul. 16, 1992
[87] PCT Pub. No.: WO91/10845
  PCT Pub. Date: Jul. 25, 1991

[30] Foreign Application Priority Data
  Jan. 18, 1990 [GB] United Kingdom ............... 9001173

[51] Int. Cl.⁵ ............................................. F16G 15/04
[52] U.S. Cl. ........................................... 59/85; 59/78
[58] Field of Search ....................... 59/78, 84, 85, 80

[56] References Cited
U.S. PATENT DOCUMENTS

| | | | |
|---|---|---|---|
| 1,114,289 | 10/1914 | Rittenhouse | 59/85 |
| 1,280,906 | 10/1918 | Vogt | 59/85 |
| 4,840,044 | 6/1989 | Scholpp | 59/80 |

FOREIGN PATENT DOCUMENTS

| | | | |
|---|---|---|---|
| 1284736 | 12/1968 | Fed. Rep. of Germany . | |
| 2207899 | 8/1973 | Fed. Rep. of Germany . | |
| 297938 | 6/1954 | Switzerland . | |
| 365242 | 12/1962 | Switzerland | 59/78 |
| 1377672 | 12/1974 | United Kingdom . | |

Primary Examiner—David Jones
Attorney, Agent, or Firm—Kane, Dalsimer, Sullivan, Kurucz, Levy, Eisele & Richard

[57] ABSTRACT

A chain comprises an assembly of a plurality of links (1) each formed of an elongate C-shaped member having an opening (5) which is adapted to receive another link to enable the links to be looped together to form a chain, and a sleeve (6) on each link which serves to close the opening (5), the chain being assembled by sliding a sleeve (6) onto each link (1) after the link (1) is looped onto the preceding link of the chain.

9 Claims, 4 Drawing Sheets

FIG.5A
FIG.5B
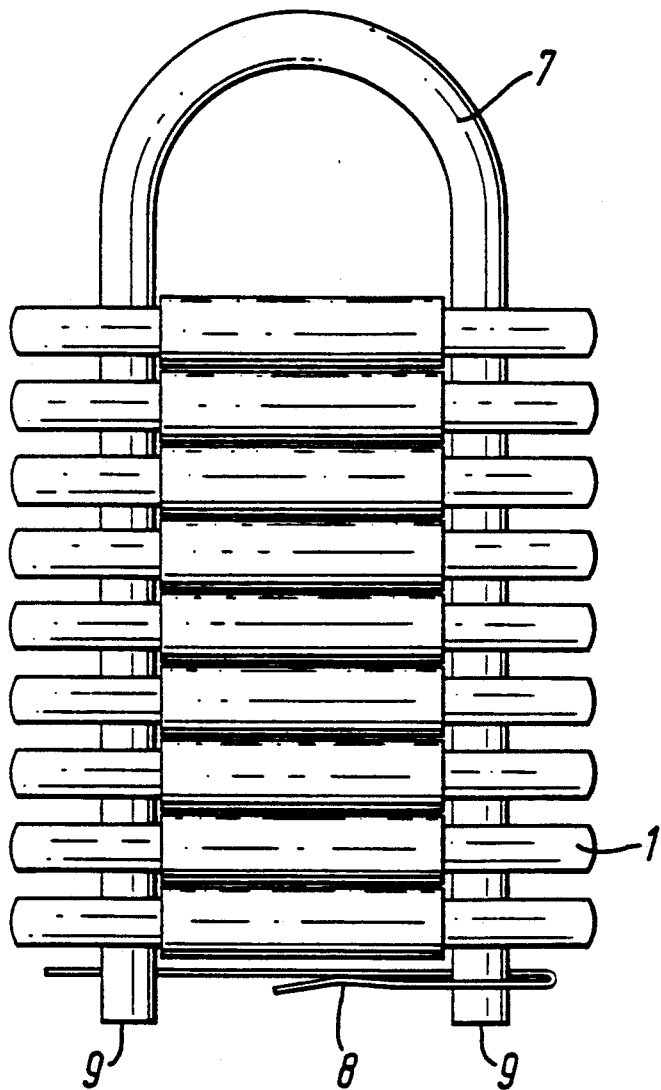
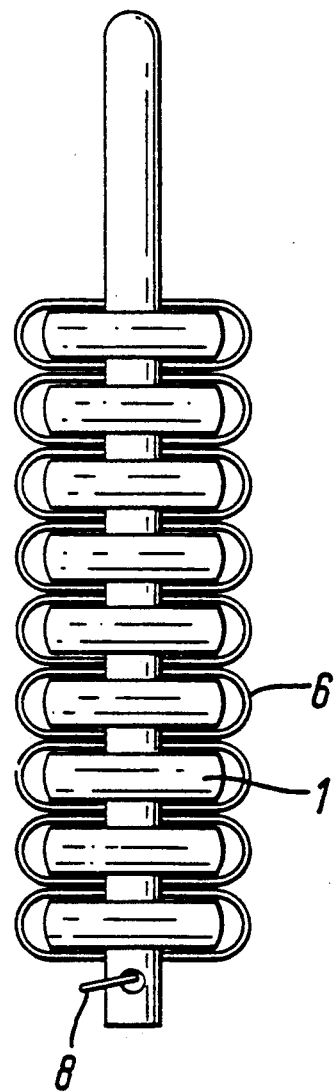

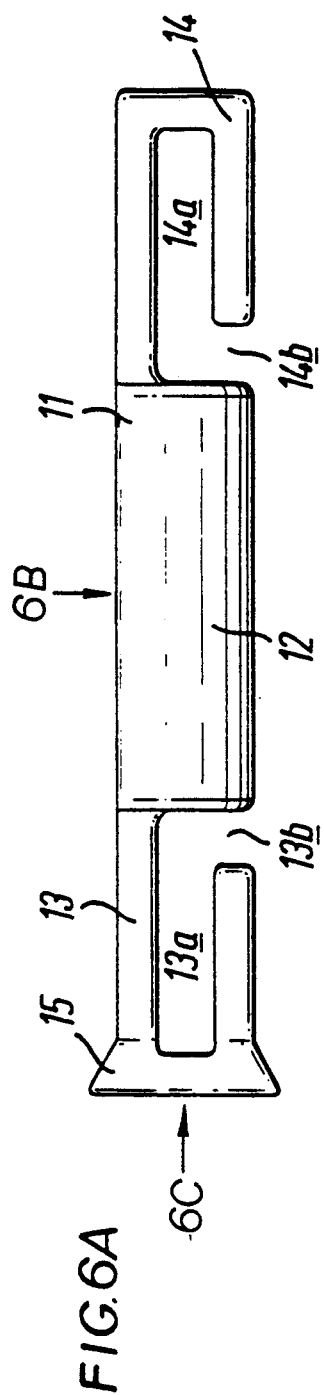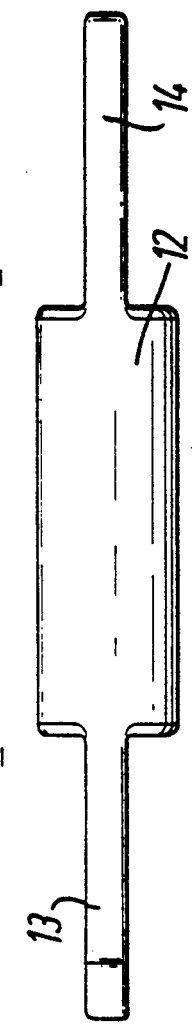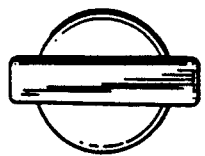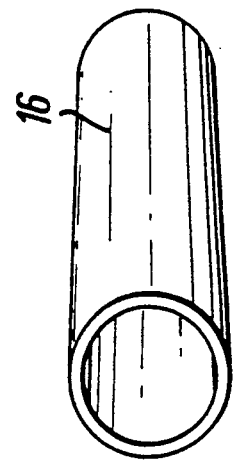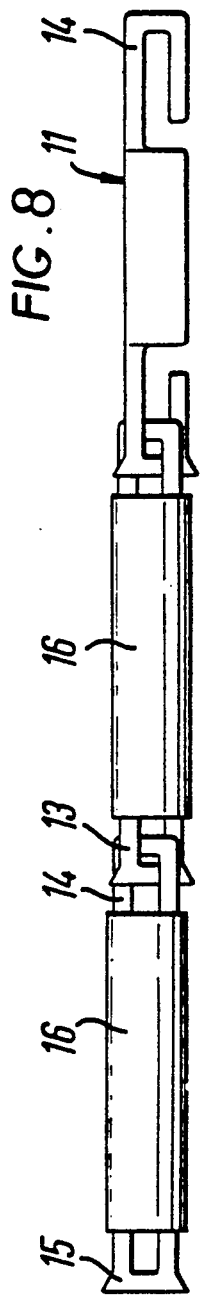

SECURITY CHAIN MADE FROM A SERIES OF LINKS

BACKGROUND OF THE INVENTION

A. Field of Invention

This invention relates to a chain, particularly but not exclusively, a security chain and a method of constructing a chain.

B. Description of the Prior Art

Security chains are known and typically consist of links formed of a hardened high strength steel. However, the links in the known chains are formed of closed links usually formed by welding together the ends of shaped loops. The existence of a weld results in a weak point in the link. The fact that the links are completed by welding limits the strength of each link to that of the weld, making the use of very high strength steels purposeless and impractical. Thus these links can be cut with bolt cutters or saws without great difficulty. Welds to a high specification to correspond to the full potential of a high grade steel involve more complex and expensive techniques. Such chains also have the disadvantage that they are made in long lengths in factories and, since they are sold at the retail stage per foot, must be cut to length for each customer. The alternative is for the manufacturer to make the chains only to order. Both of these possibilities lead to inconvenience and cost penalties.

OBJECTIVES AND SUMMARY OF THE INVENTION

The present invention seeks to provide a chain construction which overcomes these disadvantages.

According to the present invention there is provided a chain comprising an assembly of a plurality of links each formed of an elongate member having an opening which is adapted to receive another link to enable the links to be looped together to form a chain, and a sleeve on each link which serves to close the opening, the chain being assembled by sliding a sleeve onto each link after the link is looped onto the preceding link of the chain, each sleeve being retained on its link by an adjacent link, engaged therewith, the chain being capable of being disassembled by successively removing an end link, and then sleeves and links sequentially.

Preferably, the sleeve extends over the length of the link so that only a short clearance is provided in the gap between the sleeve and the adjacent links to make it difficult for a jemmy or similar instrument to be inserted into the gap. Preferably, the links are formed of a forged steel and the sleeves may be formed of a high strength extruded steel or alloy. The sleeves may alternatively be formed of a composite sandwich construction, known per se for padlocks, which is difficult to saw through.

BRIEF DESCRIPTION OF THE DRAWINGS

Preferred embodiments of the invention will now be described by way of example with reference to the accompanying drawing in which:

FIGS. 5a and 5b show a holder for the chain of FIGS. 1 to 3, and
FIGS. 6 to 8 show an alternative embodiment of the invention.

DETAILED DESCRIPTION OF THE INVENTION

Figure 1:
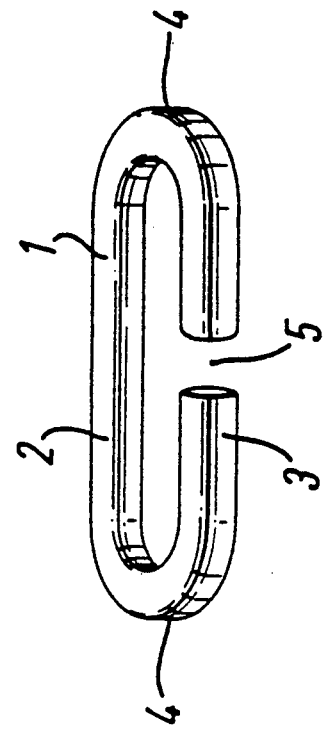
FIG. 1 shows a chain link.

The chain link shown in FIG. 1 comprises a generally C-shaped member 1 formed of an alloy steel by drop forging and having two longer sides 2, 3 joined at their ends by arcuate sections 4. One of the longer sides 3 has an opening 5 which is adapted to receive another link to enable the links to be looped together to form a chain.

Figure 2:
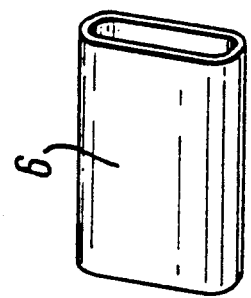
FIG. 2 shows a chain link sleeve.
Figure 3:
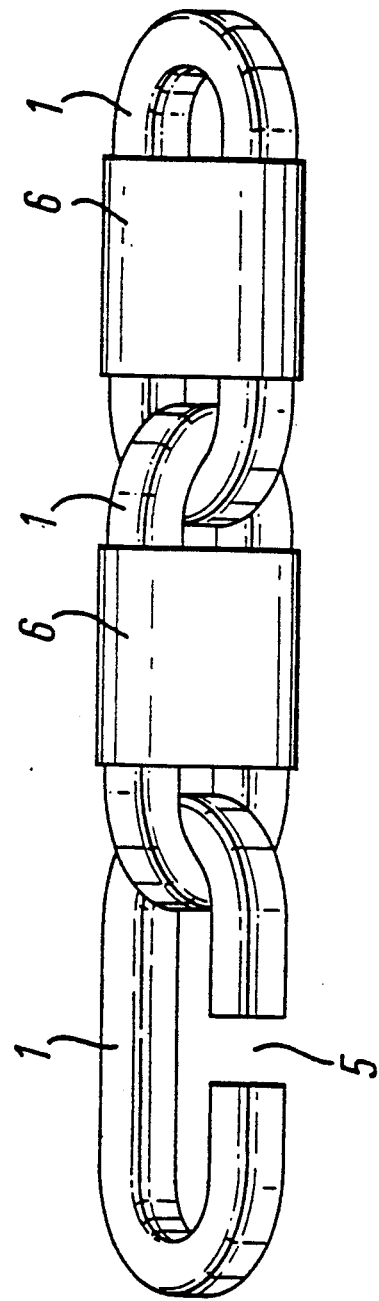
FIG. 3 shows an assembled chain.

A sleeve 6, shown in FIG. 2, generally oval in cross-section, is adapted to be a close sliding fit on each link 1. The sleeve is formed of a hardened steel or composite sandwich construction. As can be seen from FIG. 3, the sleeve 6 is at least substantially one half of the length of the link as measured from the interior of the longer sides 2, 3 (that is, from the inner portions of arcuate sections 4). This assures that the sleeve 6 will cover opening 5 when successive links are configured as shown in FIG. 3 and as described hereinafter.

To assemble a chain the links are looped together by passing one through the opening 5 of another link. A sleeve 6 is then slid onto the link 1. Another link is then looped into the link carrying the sleeve by passing it, by means of its opening 5 through the gap formed between the end of the sleeve 6 and the end section of the link. Thus a chain of the desired length can readily be assembled. The gap between the ends of the sleeve and the end sections of the interlooped links is sufficient to enable the chain to flex adequately but is not so large that a jemmy or similar tool of sufficient strength could be inserted to force the sleeve or link. The ends of the chain can then be secured in one of the usual ways such as by means of a padlock.

Figure 4A:
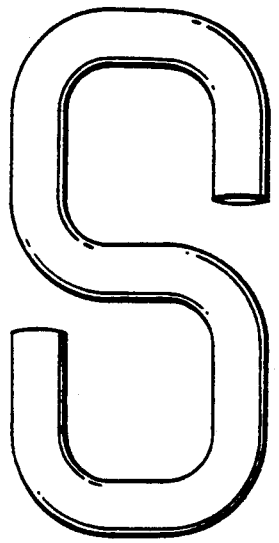
FIGS. 4a to 4e show alternative constructions of link.
Figure 4B:
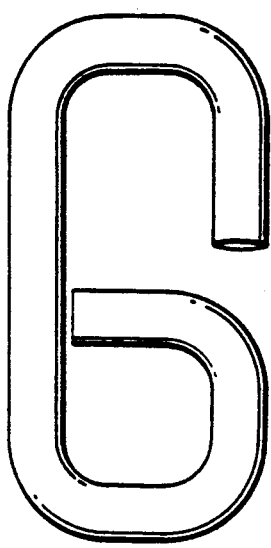
Figure 4C:
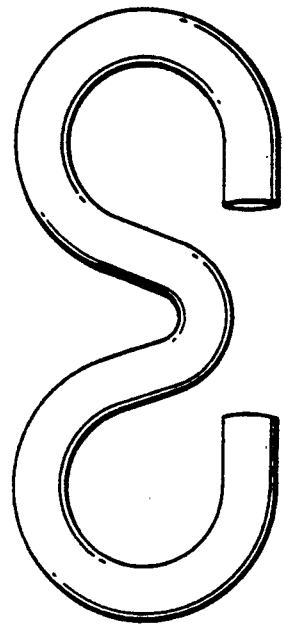
Figure 4D:
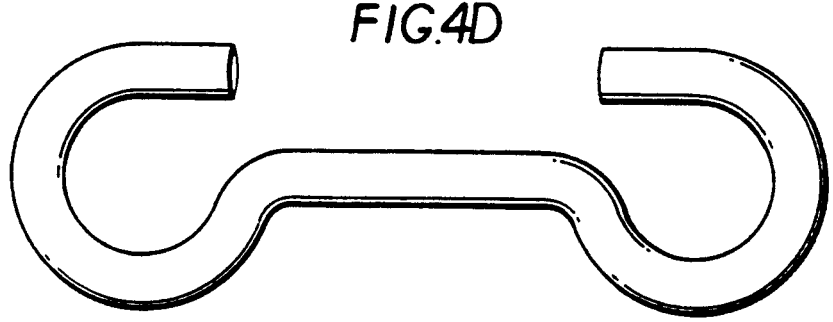
Figure 4E:
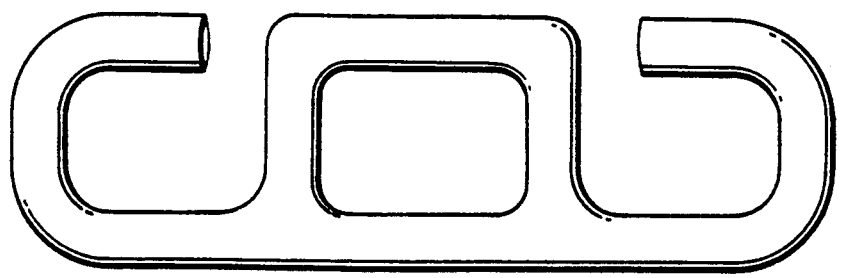

FIGS. 4a to 4e illustrate alternative shapes for the link member 1. The embodiments of FIGS. 4a to 4d are formed from wire or rod. The form shown in FIG. 4d is essentially a lightweight construction in which the centre of the sleeve in the assembled chain is not supported and is therefore more easily severed by, for example, bolt cutters. The example shown in FIG. 4e is intended for heavy duty applications and has solid support in the centre section. This example may be formed by moulding, casting, forging or by an extrusion process in which the links are formed by being sliced off the end of an elongate extrusion.

FIG. 5a and 5b show a suitable holder for the chain in the form of a U-shaped bar 7 on which the links 1 are stacked with a sleeve disposed on each link. The links are retained on the U-shaped member by a spring retainer clip 8 which extends through openings in the two free ends 9 of the bar 7. This holder makes a very convenient store for the chain and also makes carriage very easy and convenient. It also has the advantage that it constitutes a very attractive package for display in supermarkets or similar sales outlets. Although shown as a steel bar, the holder could be made of a plastics material, for example.

FIGS. 6, 7 and 8 show an alternative embodiment in which the chain is essentially circular in cross section. This embodiment is advantageous in situations where the chain has to pass through a sleeve. The chain consists of a link 11, which may be a forging, which has a cylindrical centre section 12 from the ends of which flat bar-like extensions 13, 14 extend. The extensions 13, 14 are U-shaped and each have an eye 13a, 14a with an opening 13b, 14b to enable the links to be linked together. A sleeve 16 of circular cross-section adapted to be a close sliding fit over the link 11 is illustrated in FIG. 7. The extension 13 has a shoulder or stop 15 which is adapted to prevent a sleeve sliding off the link onto the adjacent link. This prevents the sleeves being slid along the chain until a link is exposed sufficiently to be removed. FIG. 8 shows an assembled chain.

Chains constructed according to the present invention have many advantages. For example, the links can be stored easily and sold in the precise numbers required by the customer. Handling is easy as there is no long length of unwieldy chain to manhandle. No special tools are required to provide the desired length of chain.

It is not essential that the links should all be of the same size. Special applications may with advantage use links of different lengths. Also, it is easy to mark each link with a load rating to facilitate the provision of chains of a desired strength.

Although described with particular application to security chains, the invention is not to be regarded as so limited. For example, it is envisaged that chains might be constructed in plastics as a children's toy or garden fencing, or for the purposes of lifting, hauling and towing of goods and heavy equipment.

I claim:

1. A chain comprising an assembly of a plurality of links each formed of an elongate member having an opening which is adapted to receive another link to enable the links to be looped together to form a chain, and a sleeve on each link which serves to close the opening, said sleeve having a length of at least substantially one half a length of said link as measured from an interior of said link, the chain being assembled by sliding a sleeve onto each link after the link is looped onto the preceding link of the chain thereby forcing said sleeve of said preceding link to close said opening of said preceding link, each sleeve being retained on its link by an adjacent link, engaged therewith, the chain being capable of being disassembled by successively removing an end link, and then sleeves and links sequentially.

2. A chain according to claim 1 wherein, the sleeve extends over a substantial part of the length of the link so that the sleeve substantially abuts the adjacent links.

3. A chain according to claim 1, wherein the links are formed of a forged steel.

4. A chain according to claim 1, wherein the sleeves are formed of a high strength extruded alloy.

5. A chain according to claim 1, wherein the sleeves are formed of a composite sandwich construction which is difficult to saw through.

6. A chain according to claim 1, wherein the links are generally C-shaped, having longer sides joined by arcuate end portions, one of said longer sides having coaxial spaced ends to define a link receiving gap therebetween.

7. A chain according to claim 1, wherein the links are formed of an extrusion.

8. A chain comprising an assembly of a plurality of links each formed of an elongate member having an opening which is adapted to receive another link to enable the links to be looped together to form a chain, and a sleeve on each link which serves to close the opening, the chain being assembled by sliding a sleeve onto each link after the link is looped onto the preceding link of the chain, each sleeve being retained on its link by an adjacent link, engaged therewith, the chain being capable of being disassembled by successively removing an end link, and then sleeves and links sequentially, wherein the links are essentially cylindrical, the sleeves each comprising a tubular member adapted to be a close sliding fit over the associated link.

9. A chain according to claim 1, wherein the links each have a cylindrical centre section from which planar U-shaped end sections extend, a slot being formed in a side limb of the sections to enable the links to be hooked together, the sleeves each comprising a tubular member which is adapted to be a close sliding fit over the cylindrical centre section and the end sections, one of the end sections having a stop or peripheral shoulder adapted to stop the sleeve sliding off the link.

* * * * *